Aug. 4, 1959 T. R. CARTMELL ET AL 2,898,497
AIRBORNE RADIATION DETECTOR
Filed Feb. 8, 1955 2 Sheets-Sheet 2

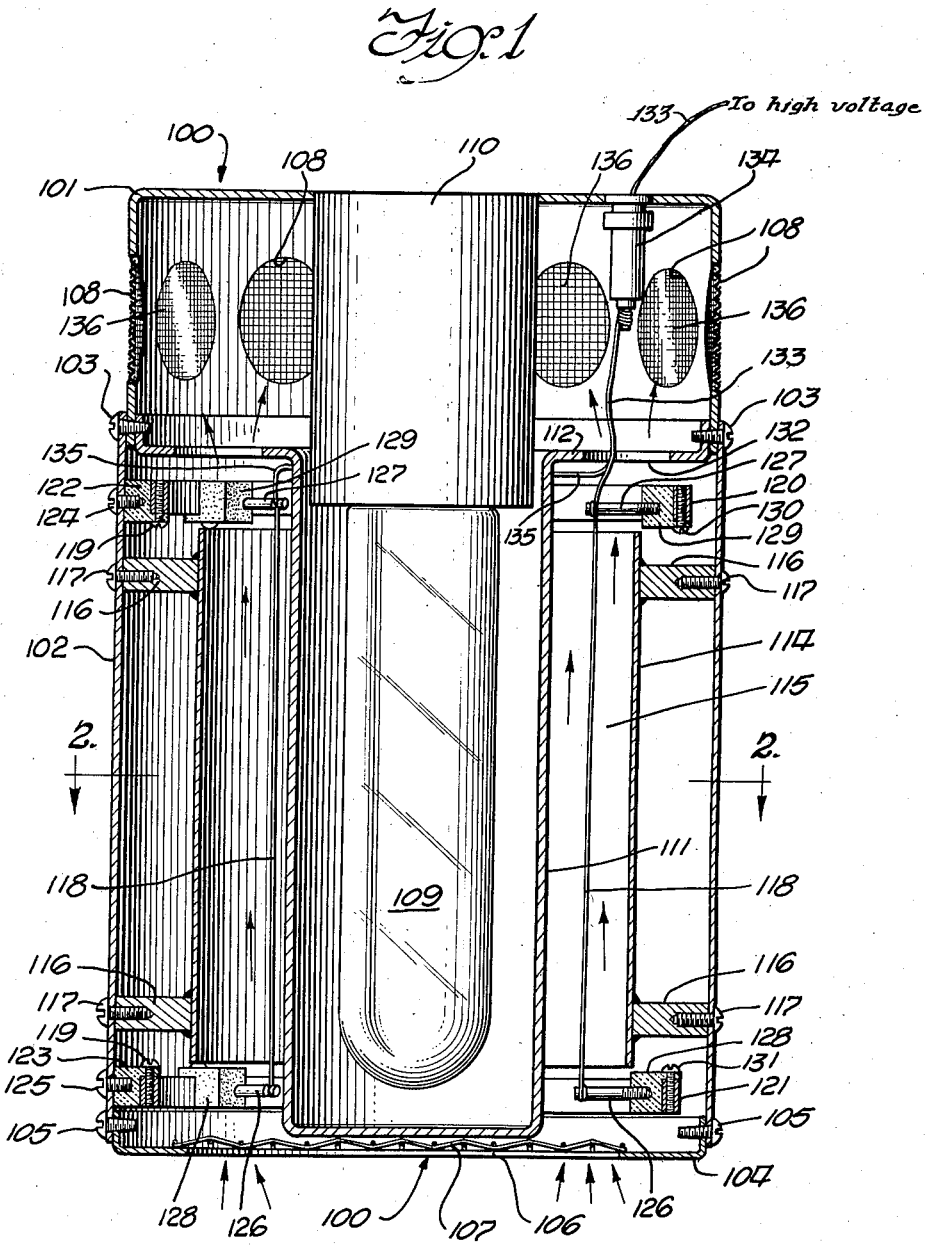

Inventors
Thomas R. Cartmell
John F. Gifford
by Roland A. Anderson
Attorney

United States Patent Office 2,898,497
Patented Aug. 4, 1959

2,898,497

AIRBORNE RADIATION DETECTOR

Thomas R. Cartmell, Richland, and John F. Gifford, Seattle, Wash., assignors to the United States of America as represented by the United States Atomic Energy Commission Application February 8, 1955, Serial No. 487,005

5 Claims. (Cl. 313—93)

The present invention relates to the art of measuring radioactivity and in particular to apparatus used for measuring the radioactivity of dust present in atmospheric air.

The most common type of device used for detecting radioactivity is an ionization chamber. An ionization chamber utilizes at least two electrodes separated from each other to form a region therebetween, and a gas filling in the region. An ionization chamber which is operated with a high potential across its electrodes to give it increased sensitivity is called a counter. The counter is usually connected in series with a voltage supply and a load resistor to produce electrical pulses. The counter is filled with a suitable gas and may even utilize ordinary air to provide molecules for dissociation into ions. The ions induced by an ionizing particle, such as an alpha or a beta particle, are collected by the electrodes in the counter. The collection of charges on the respective electrodes causes a current flow through the series circuit thereby causing a voltage drop across the resistor. The intensity of the radiation to which a counter is exposed determines the magnitude of the current flowing through the resistance thereby producing a voltage drop thereacross, which voltage drop may be measured by suitable indicating instruments.

As indicated before, the sensitivity of the ionization chamber can be increased by applying an increased high voltage to the electrodes of the chamber. If the electric field strength between the electrodes exceeds a certain value, the radiation liberated electrons will bring about a cumulated ionization, wherein more electrons will be liberated and these in turn will produce additional ionization by collisions with the other gas molecules. Eventually, all the electrons, whether produced directly by an external ionizing means or produced by the secondary collisions, will reach one of the electrodes in the chamber.

Radiation measuring instruments are used to determine the amount of radiation given off in many applications, especially those which deal with the measurement of radiation in localities where radioactive materials are produced and fabricated. In laboratories and industrial establishments where radioactive materials are handled, a hazard arises to workers due to the inhalation of dust containing radioactive isotopes, some of which are extremely harmful when they emit their characteristic particles or rays within the human body. This is particularly true of certain radioactive materials, such as plutonium, which emit alpha particles. The alpha particle radiation received on the exterior of the body is of very little danger since the effect in such a case is almost solely on the epidermis, or outer layer of skin, which is mainly composed of dead tissue and serves as a shield against the particles and radiation. The effect, however, of radioactive material in contact with the internal organs of the human body is more serious. If small amounts of the radioactive isotopes are inhaled, or otherwise enter the body, the radiation is able to affect comparatively sensitive internal portions of the body. In addition, in many cases the radiation will continue during the whole lifetime of the persons who unfortunately have been exposed to radiation which brought about inclusions of some radioactive material causing thereby damage to the tissue which is incapable of withstanding accumulative action of the radiation.

In the past, many devices have been constructed for the purpose of warning personnel of the existence of radiation hazards which are of such magnitude as to cause possible harm. Of the many devices that have been put into use for protecting personnel from the inhalation of airborne radiation particles, some of the devices utilize means for drawing the contaminated air of the atmosphere through a filter paper in order to filter out the dust particles contained in the atmosphere and a counter for measuring the radioactivity of the dust collected on the filter paper. These devices which utilize forced draft or suction for passing a certain minimum volume of atmospheric air through the filter paper have several drawbacks. For example, the propulsion means used for moving the air past the filter paper requires maintenance. Also, occasionally, the air which is drawn past the filter is contaminated with particles of dust or smoke which occlude the pores in the filter paper thereby preventing the proper amount of air to be inspected. The decrease in the volume of air inspected will result in the malfunctioning of the device thereby presenting a false sense of radiation security. The present methods of the measured air volume (filter paper type) have the disadvantage of requiring considerable working time and overly long waiting periods for measurement and evaluation.

Another disadvantage of the present devices lies in their inability to sound an alarm to indicate the existence of a hazardous radiation condition occurring for only a short duration. The radiation record of a spill or incident which occurs during sampling would be averaged out over the sampling time. Thus, a true picture of the time and magnitude of the radiation event would be lost. Sometime a period of 12 to 24 hours is required, after air sampling, to determine the contamination present at the time of sampling.

An object of the invention is to provide a reliable radiation detecting device operable in a proportional range and capable of directly and continuously inspecting airborne contaminations without the use of filter paper or other complementary components.

Another object of the invention is to provide a proportional radiation detecting apparatus utilizing the convection principle for moving sampled air through an ionization chamber.

Another object of the invention is to provide a proportional radiation detecting device which will operate immediately to give a warning signal upon the appearance of sudden and large increases of radiation emitting particles borne with other contaminants in atmospheric air.

The above objects are attained in the present invention by providing a counter having incorporated therein a lamp for supplying heat to the chamber in the counter to produce a convection flow of the atmospheric air undergoing radioactive detection. Two of these counters, each connected to a different channel comprising various electrical circuits, cooperate together to give an alarm at a predetermined radioactivity level, one of said counters located in an area free of any radioactive contamination, and the other counter located in an area suspect of radioactive contamination. The circuits in the channels are arranged so that the average background air is subtracted from the total count.

Other objects and advantages will become more apparent from a study of the following description taken in conjunction with the accompanying drawing consisting of three figures, wherein:

Figure 1 is a vertical sectional view of a radiation detector constructed according to the teachings of the present invention;

Figure 3:
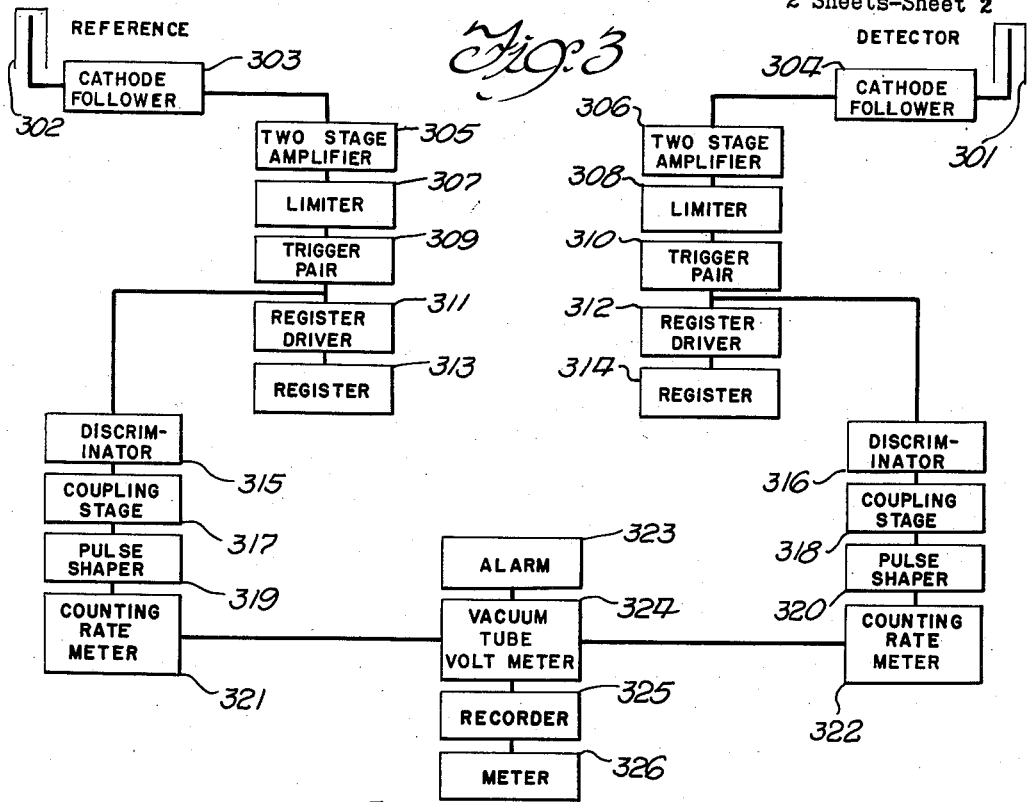
Figure 3 is a diagrammatic view of a radiation detecting device utilizing the radiation detector described herein.

Referring to Figure 1, the radiation detector 100 comprises a cylindrically shaped housing 101 joined to another cylindrically shaped housing 102 by means of screws 103. One of the apertures of the housing 102 is terminated in a shallow can 104 which is fastened to the housing 102 by means of screws 105. The can 104 has a central aperture 106 which functions as an inlet for the admission of air samples into the radiation detector 100. This opening is covered by a screen 107 to protect personnel from the high voltages found therein. The housing 101 has a series of apertures 108 distributed along its periphery. Located centrally along the longitudinal axis of the housing 102, there is a lamp 109 which is mounted in a receptacle 110 attached to the housing 101. An inner cylinder 111 having a flange 112, is coaxially mounted with respect to the lamp 109 and supported within the housing 102 by screws 103 which fasten securely the inner cylinder 111 by means of its flange 112 to the point of attachment existing at the junction of the housings 101 and 102. An outer cylinder 114 is coaxially mounted with respect to the inner cylinder 111 to form an annular region 115 therebetween, which region is known as an ionization region. The outer cylinder 114 and the inner cylinder 111 function together as common electrodes in the ionization region. The outer cylinder 114 is mounted to the housing 102 by means of supports 116 which are welded to the outer cylinder 114 and secured to the housing 102 by means of screws 117. A series of electrodes 118 pass longitudinally through the region 115 of the detector 100. The electrodes 118 are supported by means of a pair of guard rings 120 and 121. The guard rings 120 and 121 are metal rings resembling closed piston rings which are supported within the radiation detector 100 by means of guard ring supports 122 and 123 and a set of screws 119. The guard ring supports 122 and 123 are secured to the wall of the housing 102 by screws 124 and 125, respectively. The electrodes 118 are stretched parallel to the longitudinal axis of the detector 100 by means of insulators 126 and 127 which are mounted in base insulators 128 and 129, respectively. The base insulators 128 and 129 are mounted to the guard rings 121 and 120 by means of screws 131 and 130, respectively. The function of the guard rings is well known in the art and, therefore, will not be discussed. A series of screens 136 shield the apertures 108. A high voltage is connected to the electrode 118 by way of a conductor 133 which passes through an insulator tube 134. The conductor 133 has multiple connections 135 to the other electrodes dispersed in the ionization region 115.

Figure 2:
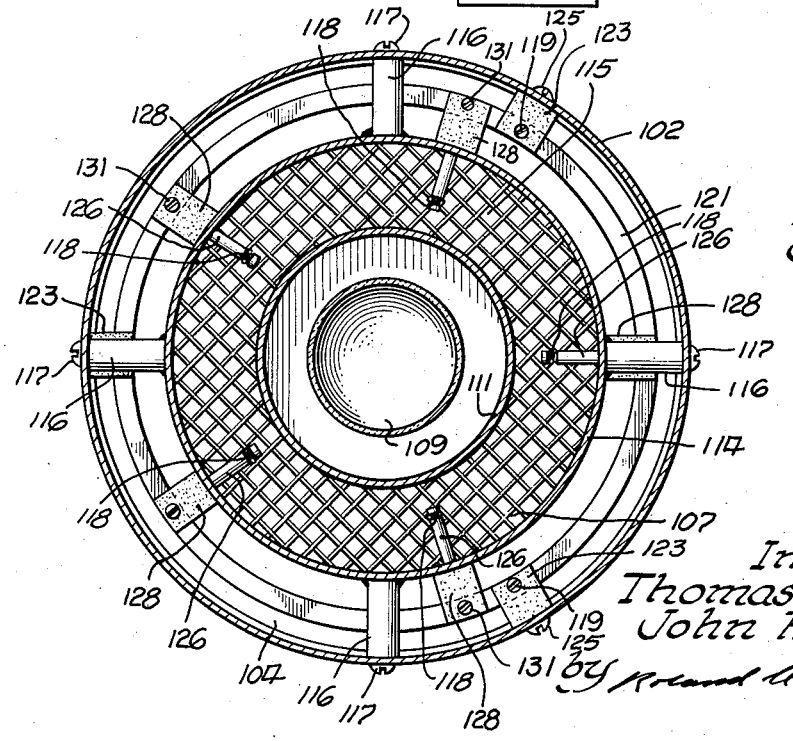
Figure 2 is a horizontal sectional view of the radiation detector taken along the lines 2—2 of Figure 1.

A detailed view of the disposition of the various components comprising the structure of the radiation detector 100 can be had from Figure 2. In the construction indicated thereon, only five electrodes 118 are shown in the ionization region 115. If necessary, additional electrodes may be dispersed throughout the ionization region 115 for increasing the sensitivity of the detector 100. Besides the various desirable features which have been indicated to be possessed by the present invention, the device described herein is noted for reducing contamination just deposition on the walls of the chamber, and for added stability due to the lowering of relative humidity and elimination of the moisture responsible for leakage paths.

The radiation detector 100 is utilized in an airborne alpha contamination alarm and recorder apparatus as shown in Figure 3. This apparatus utilizes two air proportional counting chambers of unique design coupled to appropriate twin channel circuits. One of two identical chambers, called the detector chamber 301, is placed in a suspect air region and the other, called the reference chamber 302, is located in a non-suspect or known clean air region. Application of high potential to the electrodes of the chambers creates a strong electric field therebetween. Any alpha contaminated air that enters through the bottom of the radiation detector 301 will produce a current pulse within the detector 301, the pulse being transmitted therefrom to a cathode follower 304. The output of the cathode follower 304 is fed into an amplifier 306 which amplifies the signals coming thereto. Since the amplifier 306 amplifies both weak and strong signals, it is necessary to limit the output of the amplifier, upon the receipt of strong signals, to a certain magnitude. This is accomplished by feeding the output into a limiter stage 308. The limiter 308 cuts off the peaks of the strongest signals and feeds the output into a trigger stage 310. The trigger stage 310 comprises a semi-stable circuit which upon energization reverts back to its stable state after a short period of time. A part of the output of the trigger stage 310 is fed into a register driver 312 which functions to operate a register 314 for the purpose of totalizing the number of incoming pulses detected by the radiation detector 301. The rest of the output from the trigger stage 310 is fed into a discriminator 316 and therefrom into a coupling stage 318. The discriminator 316 is adjusted to pass pulses above a certain magnitude. A pulse signal from the coupling stage 318 is fed into a pulse shaper 320. A properly shaped pulse transmitted by the pulse shaper 320 is used to operate a counting rate meter 322.

The reference radiation detector 302, which has been placed in an area which is devoid of alpha particle contamination, operates similarly as described in reference to the detector 301 placed in an area of possible contamination. The various stages employed in the two detector channels for the purpose of amplifying and properly shaping the outputs received from each of the radiation detectors are identical. The reference channel comprises a detector 302 connected to a cathode follower 303, an amplifier 305 interconnecting the cathode follower 303 to a limiter 307 which feeds into a trigger stage 309 and a register 313 connected through a register driver 311 to the output of the trigger stage 309 which also has connected thereto a discriminator 315, a coupling stage 317, a pulse shaper 319 and a counting rate meter 321 in the order given.

Finally, the output of each of the channels is fed through the individually associated counting rate meters 321 and 322 into a voltmeter 324. The voltmeter 324 is a balanced differential type of vacuum tube voltmeter. The inputs are differentially connected to the vacuum tube voltmeter 324 so that the pulses arriving from the reference detector 302 are subtracted from the pulses arriving from the detector 301. The result is that only the difference between the counting rates in the two channels, which difference is due to ionization caused by airborne alpha particles, is recorded on a recorder 325. A meter 326, which is connected to the recorder 325, gives a visual indication of the rate of pulses being recorded. At the end of a predetermined number of total counts stored, a relay (not shown) in stage 324 is energized to restore the meter 326 to zero. The vacuum tube voltmeter stage 324 is ordinarily preset to a particular counting rate so that whenever the particular rate is exceeded, an alarm 323 is operated to sound a warning to the personnel that a hazardous condition of air contamination has been reached. The circuits of the twin channels are arranged so that the average background rate of normal air is automatically subtracted from the total rate in the final recording, but all counts from both channels are retained on the impulse registers 313 and 314. The various power supplies, registers, amplifiers and other circuits comprising the two channels are conventional and require no description.

While there has been described what is at present considered to be the preferred embodiment of the invention, it will be understood that various modifications may be made therein and it is intended in the appended claims to cover all such modifications as found within the true spirit and scope of the invention.

What is claimed is:

1. A radiation detector for measuring the radioactivity of atmospheric air comprising a first cylindrical electrically conducting element, a second cylindrical electrically conducting element surrounding the first element and spaced radially outwardly therefrom to form an annular ionization region therebetween, said first element being electrically connected to the second element, an electrode mounted between the first and second elements and electrically insulated therefrom, air passages at the ends of the annular ionization region connecting the region to the surrounding atmosphere, and heating means within the first element to induce a flow of air by convection.

2. A device for detecting the presence of gas-borne radiation and particles comprising a pair of electrically interconnected spaced electrically conducting elements forming an ionization region therebetween adapted to be vertically disposed, said region communicating with the ambient atmosphere at opposite ends, an electrode disposed in said region between the interconnected elements, and means for heating the ionization region to cause a flow of gas through the ionization region by convection.

3. In the device described in claim 2, wherein the heating means comprises an electrical heating element in thermal relationship with one of said elements whereby heat is imparted by the heating element to the element to produce a convectional flow of gas through the ionization region.

4. A radiation detector for measuring radioactivity in atmospheric air comprising a heating element, a first cylindrical electrically conducting element surrounding said heating element, a second cylindrical electrically conducting element disposed coaxially about the housing and electrically connected to the first element forming an ionization region therebetween, an electrode mounted between the first element and the cylindrical element and electrically insulated therefrom, and means to transport the ambient atmosphere through the ionization region.

5. A radiation detector for measuring radioactivity in atmospheric air comprising a first electrode, a second electrode, means mounting the second electrode spaced from the first electrode to form an ionization region between the electrodes, said means having openings adjacent to opposite ends of the ionization region for the admission of air, and electrical heating means in thermal relationship with one of said electrodes to induce a flow of air through the ionization region by convection.

References Cited in the file of this patent

UNITED STATES PATENTS

| | | |
|---|---|---|
| 2,532,956 | Simpson | Dec. 5, 1950 |
| 2,625,657 | Kanne | Jan. 13, 1953 |
| 2,646,556 | Allen | July 21, 1953 |
| 2,712,610 | Lynch | July 5, 1955 |
| 2,735,953 | Tirico | Feb. 21, 1956 |
| 2,763,790 | Ohmart | Sept. 18, 1956 |